US010042969B2

(12) United States Patent
Liebmann et al.

(10) Patent No.: US 10,042,969 B2
(45) Date of Patent: Aug. 7, 2018

(54) RELIABILITY OF AN ELECTRONIC DEVICE (71) Applicant: GLOBALFOUNDRIES INC., Grand Cayman, KY (US)

(72) Inventors: Lars W. Liebmann, Poughquag, NY (US); Rasit O. Topaloglu, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 392 days.

(21) Appl. No.: 14/838,705

(22) Filed: Aug. 28, 2015

(65) Prior Publication Data
US 2017/0061062 A1 Mar. 2, 2017

(51) Int. Cl.
*G06F 17/50* (2006.01)
(52) U.S. Cl.
CPC ...... *G06F 17/5077* (2013.01); *G06F 2217/72* (2013.01)
(58) Field of Classification Search
USPC ........... 703/1, 2; 257/774; 438/640; 716/104
See application file for complete search history.

(56) References Cited

U.S. PATENT DOCUMENTS

| 7,308,669 | B2 | 12/2007 | Buehler et al. |
| 7,952,862 | B2* | 5/2011 | Sakai ................. G02F 1/13452 361/679.21 |
| 8,336,001 | B2 | 12/2012 | Chang et al. |
| 8,384,417 | B2 | 2/2013 | Laisne et al. |
| 8,689,159 | B1 | 4/2014 | Palmer et al. |
| 2013/0010240 | A1* | 1/2013 | Moriwaki ............ G02F 1/1339 349/106 |
| 2013/0069244 | A1* | 3/2013 | Blatchford ............ H01L 23/528 257/774 |
| 2013/0159587 | A1 | 6/2013 | Nygren et al. |

* cited by examiner

*Primary Examiner* — Thai Phan
(74) *Attorney, Agent, or Firm* — DeLio, Peterson & Curcio, LLC; Kelly M. Nowak (57) ABSTRACT

Improving reliability of an electronic device includes: determining whether a side space of an interconnect of the electronic device is available for a redundant interconnect, determining whether a line end electrically coupled to the interconnect may be extended into the side space for a distance sufficient to accommodate a redundant interconnect, extending the line end into the side space for the distance when available, and adding the redundant interconnect electrically coupled to the extended line end.

20 Claims, 7 Drawing Sheets

RELIABILITY OF AN ELECTRONIC DEVICE

BACKGROUND

The present disclosure is generally related to data processing, or, more specifically, methods, apparatus, and products for improving reliability of an electronic device.

DESCRIPTION OF RELATED ART

As the size of electronic devices continues to decrease, new difficulties arise in the efficient and efficacious manufacture of electronic devices. For example, interconnects are an integral part of modern semiconductor devices. Certain current approaches to improving reliability of interconnects within electronic devices rely on techniques that are no longer viable as size decreases. As a specific example, in a spacer-is-metal approach for constructing interconnects, metal features may only be available at a fixed width. This may render current approaches to improving reliability of an electronic device ineffective.

SUMMARY

Methods, apparatus, and computer program products for improving reliability of an electronic device are disclosed. They include determining whether a side space of an interconnect of the electronic device is available for a redundant interconnect, determining whether a line end electrically coupled to the interconnect may be extended into the side space for a distance sufficient to accommodate a redundant interconnect, extending the line end into the side space for the distance when available, and adding the redundant interconnect electrically coupled to the extended line end.

The foregoing and other objects, features and advantages described herein will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

As the size constraints of modern electronic devices continue to decrease, certain known techniques for ensuring the reliability of those electronic devices are no longer feasible. One particular area of reliability that is at risk from the decreasing size constraints is the reliability of conductive interconnects within the electronic device.

As used in this disclosure, an "interconnect" refers to a conductive pathway within a semiconductor device that electrically couples two portions of the semiconductor device. An interconnect may be formed by a variety of means. For example, in current technology nodes by means of a damascene process, resulting in an interconnect within the semiconductor device. An interconnect may be formed by a variety of processes and from a variety of materials (e.g., copper, aluminum, etc.).

In order to ensure the reliability of interconnects within a semiconductor device, a variety of methods have been used. For example, a via bar or redundant via insertion may be used. As the size of the device decreases, however, the opportunity for such an approach likewise decreases as it requires sacrifices in surface area and thus yield in the manufacturing process. Further, such an approach may introduce layout complexities by, for example, allowing the presence of a wide wire next to a thin wire.

Additional hurdles are presented by the use of the techniques used to manufacture smaller devices. For example, one method considered for the creation of interconnects in smaller (e.g., 10 nm or 7 nm) semiconductor devices is the use of a "spacer-is-metal" or "SIM" process. Such a process provides only fixed-width metal features. Thus, certain known reliability techniques may not be effective. For example, the use of "club ends"—a wide square landing piece at an end of an interconnect for a larger via—may no longer be as effective.

Still other techniques face challenges at smaller technology nodes. The use of local loops—a doubling of a via at one end of a line only—for example, may only address one aspect of reliability: the redundancy of the via. Redundancy of the interconnect line itself is not directly addressed. Other techniques for directly addressing the reliability of the interconnect line face further difficulties. For example, wire widening may no longer be feasible in future technology nodes. As an additional example, redundancy of entire pathways are envisioned (e.g., by forming redundant wires between two pins), which may result in wiring congestion and may not be effective when pins are not present. Still other example approaches may focus on post-production selection of multiple potential paths is taken as a way to select a reliable path.

By contrast, the present disclosure describes an approach for improving reliability of an electronic device that may be relatively more effective and/or efficient at future technology nodes, focuses on redundancy of the interconnect line, provides redundancy in even relatively small portions of a semiconductor device (e.g., when pins are not available), and requires no post-production selection. This approach includes the creation of redundant interconnects based on a plurality of factors, as described in more detail below.

Figure 1:
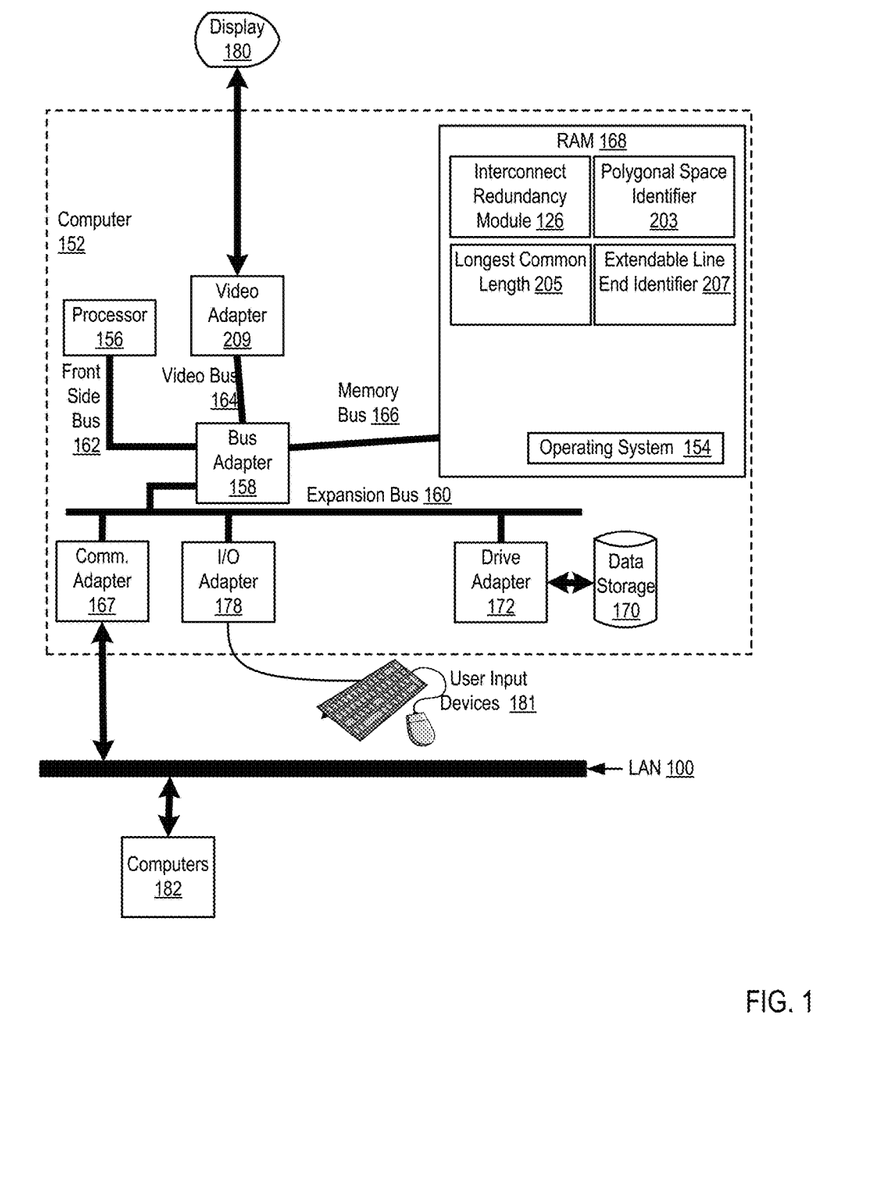
FIG. 1 sets forth a block diagram of automated computing machinery comprising an exemplary computer useful for improving reliability of an electronic device, in accordance with certain embodiments of the present disclosure.
Figure 2:
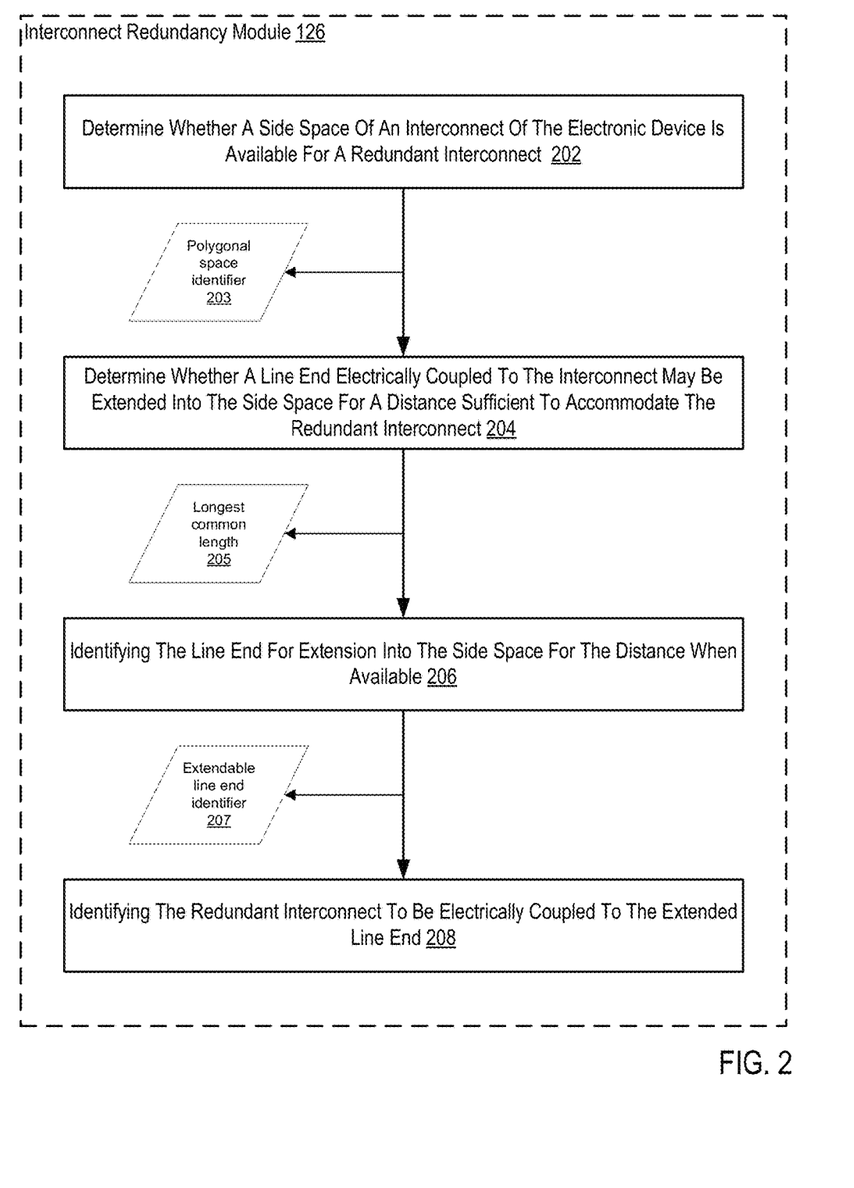
FIG. 2 sets forth a flow chart illustrating an exemplary method for improving reliability of an electronic device, in accordance with certain embodiments of the present disclosure.

Example methods, apparatus, and products for improving reliability of an electronic device in accordance with embodiments described herein with reference to the accompanying drawings, beginning with FIG. 1. FIGS. 1-2 illustrate example systems, methods, apparatuses, and computer program products for determining the appropriate use of redundant interconnects in order to improve reliability of an electronic device. FIGS. 3-7 illustrate example systems, methods, and apparatuses for manufacturing the redundant interconnects for use in the design methods illustrated in FIGS. 1-2.

FIG. 1 sets forth a block diagram of automated computing machinery comprising an exemplary computer (152) useful for improving reliability of an electronic device, in accordance with certain embodiments of the present disclosure. The computer (152) of FIG. 1 includes at least one computer processor (156) or "CPU" as well as random access memory (168) ("RAM") which is connected through a high speed memory bus (166) and bus adapter (158) to processor (156) and to other components of the computer (152).

Stored in RAM (168) is an interconnect redundancy module (126), a module of computer program instructions for improving reliability of an electronic device. The module (126) of FIG. 2 may improve reliability of an electronic device by: determining whether a side space of an interconnect of the electronic device is available for a redundant interconnect, determining whether a line end electrically coupled to the interconnect may be extended into the side space for a distance sufficient to accommodate a redundant interconnect, identifying the line end for extension into the side for the distance when available, and identifying the redundant interconnect to be electrically coupled to the extended line end, as described in greater detail below.

Also stored in RAM (168) are various data elements and/or data structures operable to allow module (126) to improve reliability of an electronic device. As described in more detail below with reference to FIGS. 2-7, example data elements may include: polygonal space identifier (203), longest common length (205) and/or extendable line end identifier (207). Each of these elements is described in more detail below with reference to FIGS. 2-4.

In some embodiments, example data elements and/or data structures may include further data elements and/or data structures. Further, although certain example data elements are illustrated in FIG. 1 to aid in understanding, additional data elements and/or data structures may be implemented in some embodiments without departing from the scope of the present disclosure. For example, as described in more detail below with reference to FIG. 2, extendable line end identifier (207) may be a part of a larger list of potential interconnect line ends.

Also stored in RAM (168) is an operating system (154). Operating systems useful for generating a contributor-based power abstract for a device according to embodiments described herein include UNIX™, Linux™, Microsoft XP™, AIX™, IBM's i5/OS™, and others as will occur to those of skill in the art. The operating system (154), and abstract generation module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for generating a contributor-based power abstract for a device according to embodiments described herein include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for generating a contributor-based power abstract for a device according to embodiments described herein include modems for wired dial-up communications, Ethernet (IEEE 802.3) adapters for wired data communications, and 802.11 adapters for wireless data communications.

The arrangement of devices making up the exemplary system illustrated in FIG. 1 are for explanation, not for limitation. Data processing systems useful according to various embodiments may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated in FIG. 1.

In some embodiments, as described in more detail below with reference to FIGS. 2-7, computer (152) may be used by a user to execute computer program instructions in order to identify potential areas of a semiconductor device design wherein it may be effective and/or efficient to add a redundant interconnect to one or more interconnects. The resulting design may then be implemented in order to manufacture a semiconductor device including the redundant interconnect(s).

For further explanation, FIG. 2 sets forth a flow chart illustrating an exemplary method for improving reliability of an electronic device, in accordance with certain embodiments of the present disclosure. The example method of FIG. 2 includes determining (202) whether a side space of an interconnect of the electronic device is available for a redundant interconnect. A "side space," as the term is used in this specification, is any portion of space on either side of a portion of an interconnect. Generally, a "side" of an interconnect may be understood to be the space in any dimension distal from the interconnect. For the purposes of illustration in this disclosure, and to aid in understanding, a side is typically illustrated as a familiar two-dimensional "side." However, in some embodiments (e.g., in three-dimensional semiconductor devices with interconnects between layers), a "side" may be in any appropriate dimension distal from the interconnect.

As described in more detail below with reference to FIGS. 3-7, determining (202) whether a side space of an interconnect of the electronic device is available for a redundant interconnect may include selecting a polygonal space including a portion of the interconnect and a portion of the side space on at least one side of the interconnect. For example, a designer of a semiconductor device may select a substantially rectangular area incorporating one or more interconnect(s), a portion of the conductive lines to which the interconnect(s) are electrically coupled, and some or all of the side space associated with the interconnect(s). Other shapes may be chosen without departing from the scope of the present disclosure. Further, a polygonal space may extend into three dimensions.

Once the polygonal space is identified, the space may then be analyzed to determine whether the side space associated with the interconnect within the polygonal space is available for a redundant interconnect. For example, this may include identifying any other components (e.g., other wires, paths, electrical components, etc.) of the electronic device already present within the side space. As part of determining (202) whether a side space of an interconnect of the electronic device is available for a redundant interconnect, a polygonal space identifier (203) may be stored in RAM (168) of computer (152). In some embodiments, this may be a data value or values stored in RAM (168) indicating certain parameters of the selected polygonal space (e.g., position, shape, size, whether it was empty, etc.). In some embodiments, polygonal space identifier (203) may be further used to determine a complete redundancy path, as described in more detail below and with reference to FIG. 7 by for example, compilation with other polygonal space identifiers (203) associated with neighboring polygonal spaces in order to determine whether a larger polygonal space comprised of smaller polygonal spaces may host a redundant interconnect.

In some embodiments, the selection of the polygonal space may be based on a variety of design factors. For example, a timing-aware redundancy design may select a polygonal space along a timing critical path in order to ensure timing closure. As an additional example, a reliability-aware redundancy design may select a polygonal space to ensure reliability (e.g., immunity to electromigration, etc.) along a path. By analyzing a design incrementally by polygonal space, a designer may be able to focus redundancy efforts at key points.

Figure 7:
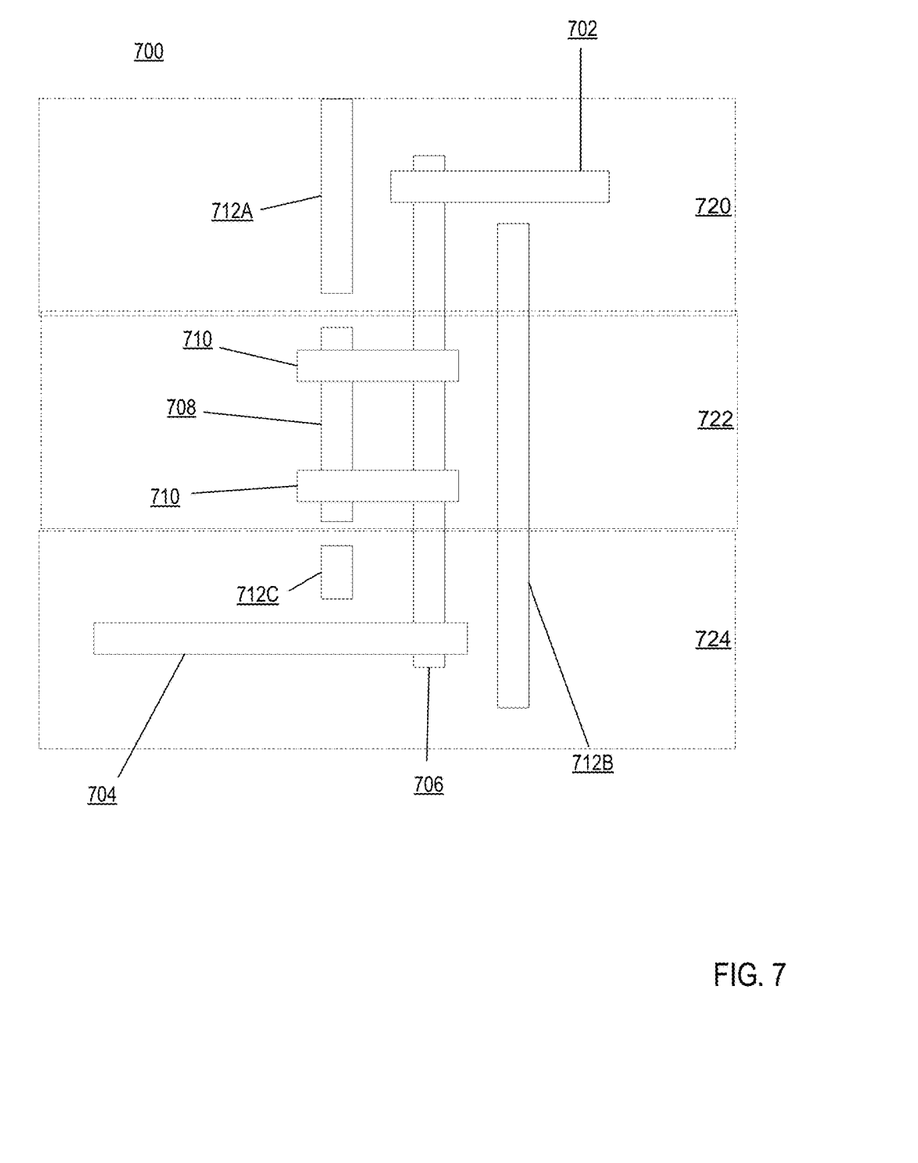
FIG. 7 illustrates a second example structure for implementing redundant interconnects, in accordance with certain embodiments of the present disclosure.

Further, by analyzing a design incrementally by polygonal space, a design may take advantage of partial redundancy, as described in more detail below and with reference to FIG. 7. For example, in a complex design with many paths competing for physical space, only a portion of the space along an interconnect between two lines may be available. By analyzing that space incrementally, appropriate empty portions may be utilized for redundancy.

In still further embodiments, the example method of FIG. 2 may not include an explicit selection of a polygonal space. For example, in a two-dimensional design of a semiconductor device, it may be efficient to predefine a set polygonal space (e.g., rectangular of a set size), and repeat analysis of the set polygonal space over the entire topology.

The example method of FIG. 2 also includes determining (204) whether a line end electrically coupled to the interconnect may be extended into the side space for a distance sufficient to accommodate the redundant interconnect. As described in more detail below and with reference to FIGS. 3-7, an interconnect may be electrically coupled to one or more line ends. A "line end," for the purposes of this disclosure includes a termination or near-termination of a conductive path (e.g., a "line") electrically coupled to the interconnect. For example, an interconnect may be electrically coupled to a variety of line types (e.g., a power rail, a conductive pad, etc.). Determining (204) whether a line end electrically coupled to the interconnect may be extended into the side space for a distance sufficient to accommodate the redundant interconnect may include determining whether an extension of the line may adversely impact some other characteristic of the line, the topology, and/or the semiconductor device as a whole. For example, increasing the length of a conductive line may correspondingly increase an impedance associated with that line. Depending on the criticality of that impedance to the design, it may be against the designer's choice to exchange the increase in impedance for increased reliability of the interconnect. Depending on the configuration, other properties of the line (e.g., power consumption, physical constraints, etc.) may prevent the line from being able to be extended into an available side space.

As part of determining (204) whether a line end electrically coupled to the interconnect may be extended into the side space for a distance sufficient to accommodate the redundant interconnect, longest common length (205) may be stored in RAM (168) of computer (152). In some embodiments, this may be a data value or values stored in RAM (168) indicating a longest common length available for a redundant interconnect. "Longest common length," as used in this disclosure, is the largest area of an available side space into which a redundant interconnect may be placed.

In some embodiments, the longest common length (205) may be the full extent of the side space associated with the analyzed polygonal space. For example, if a polygonal space is chosen such that it incorporates two line ends, between which an interconnect is electrically coupled (and does not extend beyond), and there is no obstruction within the side space of the associated interconnect, then the longest common length (205) may be determined to be the full distance between the two lines.

In alternative embodiments, the longest common length (205) may be only a portion of the side space available for a redundant interconnect within a side space of an analyzed polygonal space. Referring again to the above example, if only a portion (e.g., a middle fifty percent) of the side space between the two lines was free from obstruction (e.g., other components of the semiconductor device), then the longest common length (205) may be the value of the portion of the side space (e.g., a percentage, distance, location, fraction indicator, etc.) available for a redundant interconnect.

In still other embodiments, the longest common length (205) may be a calculated and/or derived value from other longest common length values. For example, as described in more detail above and below with reference to FIG. 7, a redundant interconnect analysis may analyze a plurality of polygonal spaces for available side space. In some configurations, the plurality of polygonal spaces may be substantially adjacent. The longest common length (205) may be stored for each constituent polygonal space. A further analysis of the constituent polygonal spaces as a collective may then synthesize the constituent longest common length (205) values in order to determine a relatively collective longest common length (205).

The example method of FIG. 2 also includes identifying (206) the line end for extension into the side for the distance when available. In some embodiments, this may include setting an extendable line end identifier (207) in order to indicate that the relevant line end should be extended into the available side space. In some embodiments, extendable line end identifier (207) may be stored in RAM (168) of computer (152). In some embodiments, this may be a data value or values stored in RAM (168) indicating a line end available for expansion into the available side space. In some embodiments, as analogously described above, extendable line end identifier (207) may be a calculated and/or derived value. For example, in configurations in which a plurality of constituent polygonal spaces are being analyzed for a collective longest common length (as described in more detail above), the example method illustrated in FIG. 2 may also include analyzing the identities of constituent extendable line ends in order to identify how many line ends may be extended into the available side space. In some embodiments, this may be combined with collective longest common length (205) information in order to determine specifically the desired redundant interconnect for use.

The example method illustrated in FIG. 2 also includes identifying (208) the redundant interconnect to be electrically coupled to the extended line end. As described in more detail above, there may be a variety of considerations taken into account in identifying the specific redundant interconnect to electrically couple to an extended line end. For example, a system designer may determine that a redundant interconnect is not worth the tradeoff of space, cost, performance, etc. In some configurations, it may include a determination not to extend an interconnect along the entire length of a collective longest common length for a variety of considerations for each of the constituent polygonal spaces.

Figure 3:
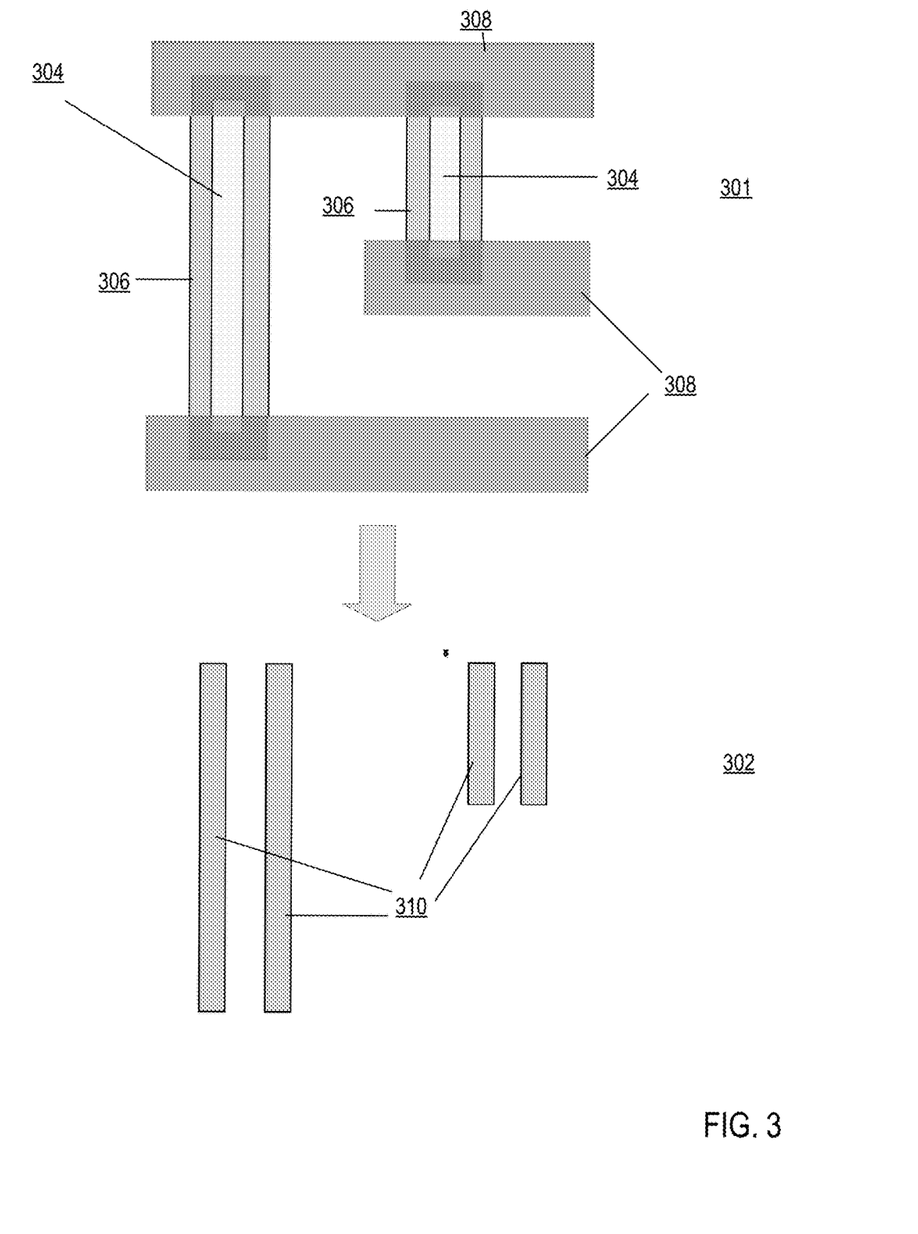
FIG. 3 illustrates example steps in the manufacturing of redundant interconnects, in accordance with certain embodiments of the present disclosure.

FIG. 3 illustrates example steps in the manufacturing of redundant interconnects, in accordance with certain embodiments of the present disclosure. The example steps illustrated in FIG. 3 include a masked step (301) and a post-mask step (302), in accordance with certain embodiments of the present disclosure. Masked step (301) and post-mask step (302) are example, simplified steps in the manufacture of redundant interconnects for use as described in more detail above with reference to FIGS. 1-2. The example steps (301, 302) are part of a "spacer-is-metal" (or "SIM") manufacturing process. SIM processes are one of a variety of manufacturing methods under consideration for the manufacture of future, smaller technology nodes (e.g., 10 nm, 7 nm, etc.). Specifically, SIM is a type of self-aligned double patterning wherein a sidewall spacer is used as a self-aligning mechanism, the sidewall spacer defines locations for final metal. Thus, the metal used in an SIM process will be whatever metal is desired in the final metal pattern (e.g., copper, aluminum, gold, etc.).

Masked step (301) illustrates a simplified, top-down block diagram of a portion of a semiconductor device undergoing interconnect formation. Masked step (301) includes a plurality of mandrels (304). Mandrels (304) are a patterned structure on a semiconductor substrate, filled with a dielectric material, a silicon-based material, or a resist-based material. Generally, mandrels (304) result from the first mask layout in a SIM process, and may also be referred to as a "core layout." Mandrels (304) may be of a variety of shapes, lengths, dimensions, etc. In most configurations, mandrels (304) will be of a uniform thickness and material across a semiconductor device. Mandrels (304) will most likely vary in length across a semiconductor device, depending on the use to which the resultant interconnect is put. Each mandrel (304) is surrounded by a spacer (306). The mandrel/spacer combinations then have a portion covered by one or more cutmask(s) (308). Cutmask (308) is any appropriate mask appropriate to remove a portion of the mandrel/spacer combination. By applying cutmask (308), a portion of the mandrel/spacer combination is removed. The mandrels (304) may then be removed, leaving only the patterned spacers (310), as illustrated in post-mask step (302). The patterned spacers (310) may be a final or intermediate step in a manufacturing process after other process steps. For example, these steps may include resist deposition, masking, etching, electroplating, chemical-mechanical polishing, etc.

In some embodiments, the resultant structures in post-mask step (302) may be used as interconnects, as described in more detail below with reference to FIGS. 6-7. In a SIM process, the metal patterns always result in pairs. One potential approach in using SIM processes in future technology nodes has been to further process the resultant structures in post-mask step (302) by removing one of the resultant pairs. However, this may be detrimental to overall manufacturing efficiency, as one line may subsequently print thinner than another. By taking advantage of this feature of SIM processes, redundant interconnects may be implemented as part of the SIM process without the use of additional masking steps.

Figure 4:
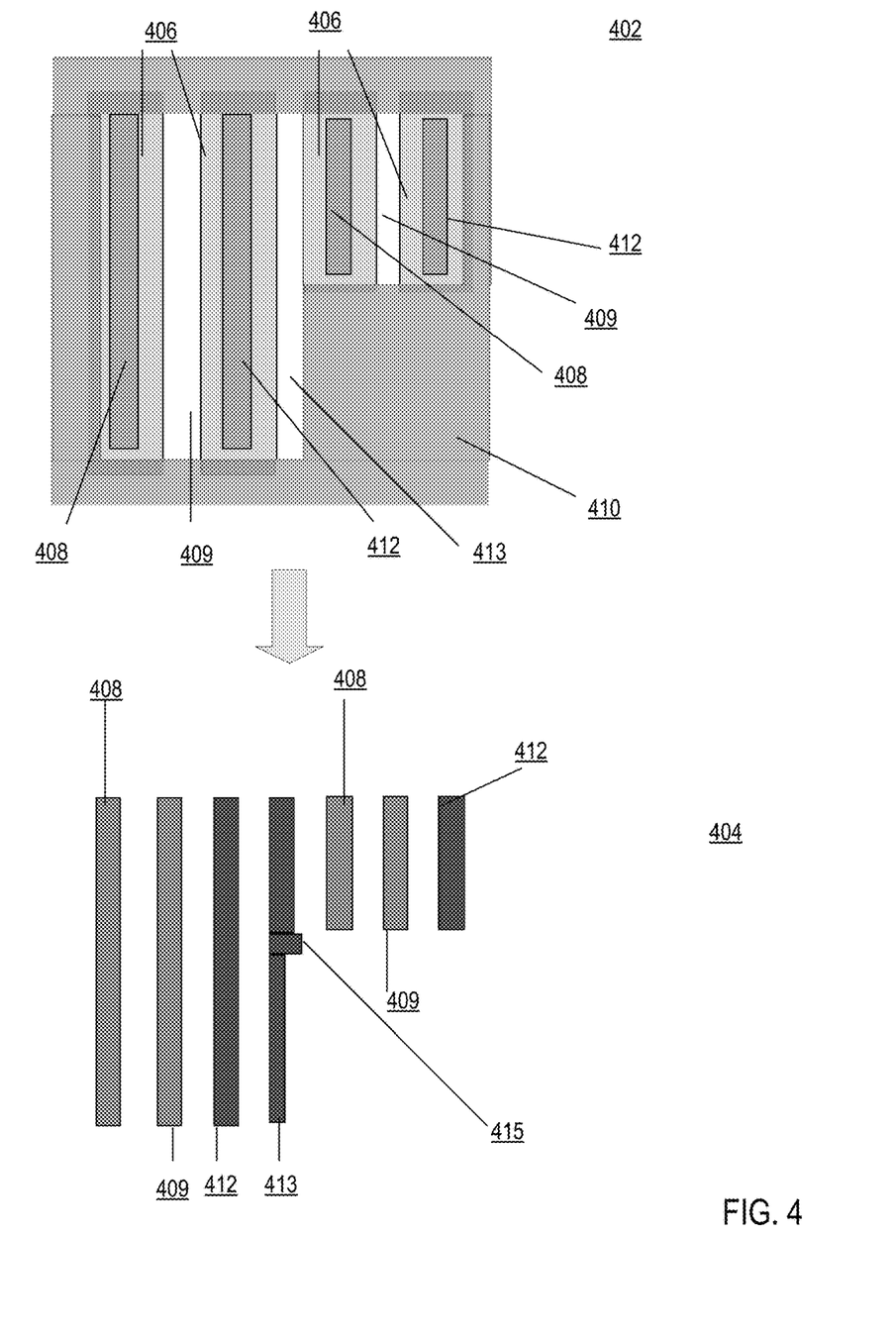
FIG. 4 illustrates example steps in a second method of manufacturing of redundant interconnects, in accordance with certain embodiments of the present disclosure.

FIG. 4 illustrates example steps in a second method of manufacturing of redundant interconnects, in accordance with certain embodiments of the present disclosure. The example steps illustrated in FIG. 4 include a masked step (402) and a post-mask step (404), in accordance with certain embodiments of the present disclosure. Masked step (402) and post-mask step (404) are example, simplified steps in the manufacture of redundant interconnects for use as described in more detail above with reference to FIGS. 1-2. The example steps (402, 404) are part of a "spacer-is-dielectric" (or "SID") manufacturing process. SID processes are one of a variety of manufacturing methods under consideration for the manufacture of future, smaller technology nodes (e.g., 10 nm, 7 nm, etc.). Specifically, SID is a type of self-aligned double patterning wherein a sidewall spacer is used as a self-aligning mechanism, the sidewall spacer is made from a dielectric material, and the mandrel layout and the space between opposing sidewall spacers (discussed below), becomes the final metal pattern. Thus, the metal used in the mandrel pattern of a SID process will be whatever metal is desired in the final metal pattern (e.g., copper, aluminum, gold, etc.).

Masked step (402) illustrates a simplified, top-down block diagram of a portion of a semiconductor device undergoing interconnect formation. Masked step (402) includes a plurality of mandrels (408) and a plurality of spaces between mandrels (or a "not-mandrel") (409). Mandrels (408) are a patterned structure on a semiconductor substrate. Mandrels (408) can be formed from dielectric, silicon-based materials, or resists. Generally, mandrels (304) result from the first mask layout in a SIM process, and may also be referred to as a "core layout." Mandrels (408) may be of a variety of shapes, lengths, dimensions, etc. In a SID process, it may be easier to vary the line width of mandrels (408) in contrast with a SIM process. Mandrels (408) will most likely vary in length across a semiconductor device, depending on the use to which the resultant interconnect is put.

In some embodiments, each mandrel (408) is surrounded by a spacer (406) formed from a dielectric. The mandrel/spacer combinations then have a portion covered by one or more cutmask(s) (408). Cutmask (410) is any appropriate mask appropriate to remove a portion of the mandrel/spacer combination. By applying cutmask (410), a portion of the mandrel/spacer combination is removed. Spacers (406) may then be removed, leaving only the patterned mandrels (408, 409).

In certain SID processes, cutmask (410) includes a plurality of inner corners. Some SID processes have determined, therefore, that it is better to use cutmask (410) only for line ends. This may be done, for example, by adding dummy mandrels (412, 413) to a side of mandrels (408). These dummy mandrels (412, 413) may also be patterned as a result of the application of cutmask (410), as illustrated in post-mask step (404). In the example steps illustrated in FIG. 4, the transition from a side of spacer (406) uncovered by cutmask (410) to a non-covered side may result in some problematic features. For example, as illustrated in post-mask step (404), protrusion (415) extruding from patterned dummy mandrel (413) may negatively impact the performance of patterned mandrels (408, 409, 412, 413) for use as interconnects. A potential solution to this issue is described in more detail below with reference to FIG. 5.

In some embodiments, the resultant structures in post-mask step (404) may be used as interconnects, as described in more detail below with reference to FIGS. 6-7. In a SID process, the metal patterns do not always result in pairs. However, the use of dummy mandrels in order to optimize the use of the SID process may result in duplicate structures. By taking advantage of this feature of SID processes, redundant interconnects may be implemented as part of the SID process without the use of additional masking steps.

Figure 5:
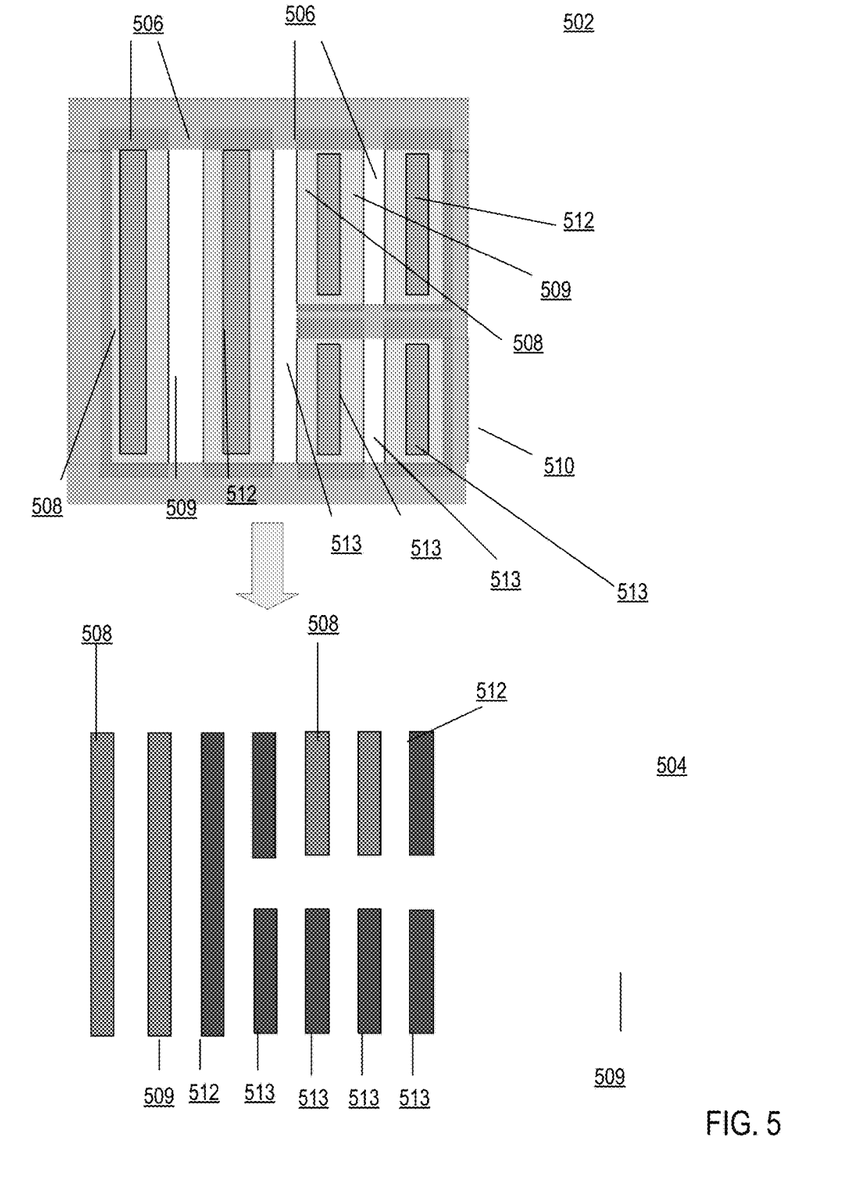
FIG. 5 illustrates example steps in a third method of manufacturing of redundant interconnects, in accordance with certain embodiments of the present disclosure.

FIG. 5 illustrates example steps in a third method of manufacturing of redundant interconnects, in accordance with certain embodiments of the present disclosure. The example steps illustrated in FIG. 5 include a masked step (502) and a post-mask step (504), in accordance with certain embodiments of the present disclosure. As described in more detail above with reference to FIG. 4, masked step (502) and post-mask step (504) are part of a SID manufacturing process. In order to address issues related to the use of dummy mandrels in the example method illustrated in FIG. 4, the example method illustrated in FIG. 5 uses a full dummy mandrel set up.

Masked step (502) illustrates a simplified, top-down block diagram of a portion of a semiconductor device undergoing interconnect formation. Masked step (502) includes a plurality of mandrels (508, 509). In some embodiments, each mandrel (508) is surrounded by a spacer (506) formed from a dielectric. The mandrel/spacer combinations then have a portion covered by one or more cutmask(s) (508). Cutmask (510) is any appropriate mask appropriate to remove a portion of the mandrel/spacer combination. By applying cutmask (510), a portion of the mandrel/spacer combination is removed. Spacers (506) may then be removed, leaving only the patterned mandrels (508, 509).

In certain SID processes, cutmask (510) includes a plurality of inner corners. Some SID processes have determined, therefore, that it is better to use cutmask (510) only for line ends. This may be done, for example, by adding dummy mandrels (512, 513) to a side of mandrels (508). These dummy mandrels (512, 513) may also be patterned as a result of the application of cutmask (510), as illustrated in post-mask step (504). In the example steps illustrated in FIG. 5, additional dummy mandrels (513) may result in a more even metal structure pattern.

In some embodiments, the resultant structures in post-mask step (504) may be used as interconnects, as described in more detail below with reference to FIGS. 6-7. In a SID process, the metal patterns do not always result in pairs. However, the use of dummy mandrels in order to optimize the use of the SID process may result in duplicate structures. By taking advantage of this feature of SID processes, redundant interconnects may be implemented as part of the SID process without the use of additional masking steps.

Figure 6:
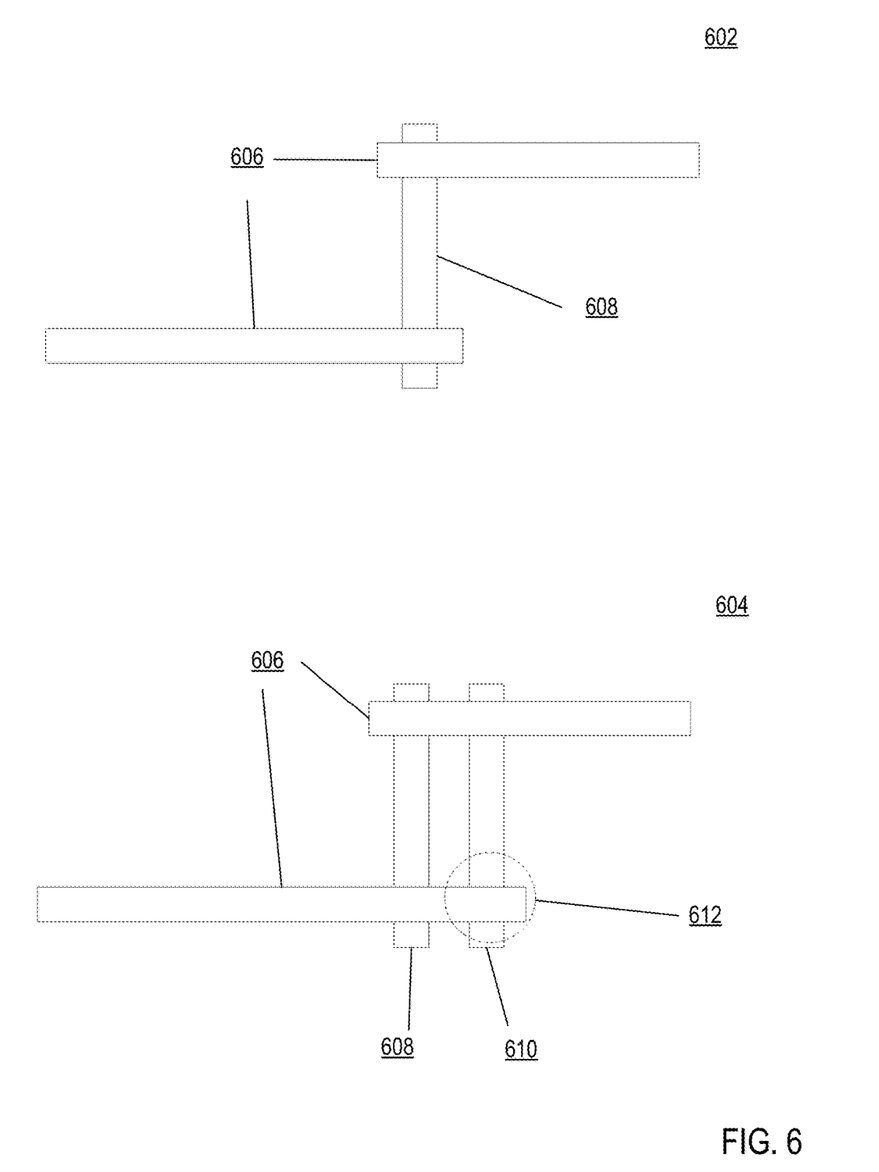
FIG. 6 illustrates a pair of example structures for implementing redundant interconnects, in accordance with certain embodiments of the present disclosure.

FIG. 6 illustrates a pair of example structures for implementing redundant interconnects, in accordance with certain embodiments of the present disclosure. FIG. 6 illustrates a pair of example structures (602, 604). Example structure (602) illustrates a pair of conductive lines (606) electrically coupled to an interconnect (608), as described in more detail above with reference to FIGS. 1-2. As described in more detail above with reference to FIGS. 3-5, redundant interconnects may be manufactured in a variety of manners.

In order to determine whether and/or how example structure (602) may incorporate a redundant interconnect, an analysis of structure (602) may be undertaken, as described in more detail above with reference to FIGS. 1-2. In the example structure (602), determining (202) whether a side space of an interconnect of the electronic device is available for a redundant interconnect includes determining whether a side space of an interconnect (608) is available for a redundant interconnect. As an illustrative example, side space is available on both sides of interconnect (608).

As described in more detail above with reference to FIGS. 1-2, determining (202) whether a side space of an interconnect of the electronic device is available for a redundant interconnect may include generating one or more polygonal space identifier(s) (203). In such a configuration as example structure (602), polygonal space identifiers (203) may include an indication of whether a side space within the polygonal space is available. In other configurations, more, less, or different data may be part of polygonal space identifier (203) without departing from the scope of the present disclosure.

In the illustrative example structure (602), after analyzing space constraints, analysis may then proceed to determine whether a line end electrically coupled to the interconnect may be extended into the side space for a distance sufficient to accommodate a redundant interconnect. As an illustrative example, either of the conductive lines (606) may extend into the side space. As described in more detail above with reference to FIGS. 1-2, determining (204) whether a line end electrically coupled to the interconnect may be extended into the side space for a distance sufficient to accommodate a redundant interconnect may include generating a longest common length (205). In such a configuration as example structure (602), longest common length (205) may include a value indicative of the amount of space available between conductive lines (606). In other configurations, more, less, or different data may be part of longest common length (205) without departing from the scope of the present disclosure. For example, as described in more detail below with reference to FIG. 7, longest common length (205) may be different when considering a plurality of polygonal spaces.

As described in more detail above with reference to FIGS. 1-2, certain design considerations may be taken into account in deciding which conductive line(s) (606) may be extended where and how far. For example, electrical considerations may factor into whether a given conductive line (606) should be extended.

In the illustrative example structure (602) after analyzing line ends, analysis may then proceed to identifying the line end for extension into the side space for the distance when available. As an illustrative example, the lower positioned of the conductive lines (606) may be identified for extension into the side space. Alternatively, the upper positioned of the conductive lines (606) may be identified for extension into the side space. As described in more detail above with reference to FIGS. 1-2, identifying (206) the line end for extension may include generating an extendable line end identifier (207). In such a configuration as example structure (602), extendable line end identifier (207) may include a value indicative of one or more of the conductive lines (606). In other configurations, more, less, or different data may be part of extendable line end identifier (207) without departing from the scope of the present disclosure Once the line end(s) for extension are identified, analysis may then turn to identifying the redundant interconnect to be electrically coupled to the extended line end. Example structure (604) illustrates the pair of conductive lines (606) electrically coupled to interconnect (608), as well as redundant interconnect (610). In the illustrated example structure (604), one end of one of the conductive lines (606) (a "line end") has been extended via extension region (612) in order to electrically couple to redundant interconnect (610). Although example structure (604) illustrates one of the pair of conductive lines (606) extending through extension region (612), either of the pair of conductive lines (606) could extend in any appropriate direction without departing from the scope of the present disclosure.

Redundant interconnect (610) may be formed by any appropriate means, including those described in more detail above with reference to FIGS. 3-5. By establishing the presence of redundant interconnect (610) at the design stage, post-production selection of appropriate electrical paths may be avoided. Further, reliability of the electronic device may be improved by providing redundancy to at least a portion of the interconnect line path. Still further, this may be accomplished within the bounds of otherwise limiting manufacturing processes (e.g., spacer-is-metal processes in which line width is substantially constant).

Another factor in extending conductive line(s) (606) is the presence or absence of other components of the semiconductor device. These other components may be taken into account in structuring redundant interconnects. FIG. 7 illustrates a second example structure (700) for implementing redundant interconnects, in accordance with certain embodiments of the present disclosure.

Example structure (700) includes a pair of conductive lines (702, 704) electrically coupled to one another by an interconnect (706). In example structure (700), both conductive lines (702), 704) are blocked from expanding in order to accommodate a redundant interconnect due to the presence of other components (712). Other components (712) may include some or all of other conductive paths in other parts of the semiconductor device, electrical components of the semiconductor device, structural components of the semiconductor device, etc.

As described in more detail above with reference to FIGS. 1-2, a design analysis of example structure (700) can look at all or a portion of example structure (700) in order to determine where, if anywhere, a redundant interconnect may be placed. If, to illustrate, example structure were considered as a whole, then no redundant interconnect may be included. Alternatively, if example structure (700) were considered in sections (e.g., as a series of polygonal spaces), then a portion of the side space associated with interconnect (706) may be available to accommodate a redundant interconnect.

In some embodiments, analysis of example structure (700) may include considering a series of substantially adjacent, polygonal structures (720, 722, 724). In example structure (700), these polygonal structures are illustrated as substantially rectangular to aid in understanding. However, polygonal structures (720, 722, 724) may be of any appropriate polygonal shape without departing from the scope of the present disclosure. As described in more detail above with reference to FIGS. 1-2, an analysis of each polygonal structure (720, 722, 724) may be taken in turn to first determine whether a side space of interconnect (706) of the electronic device is available for a redundant interconnect. For example, considering polygonal structure (720) first, it may be determined that there is no side space available on either side of interconnect (706) due to the presence of other components (712A, 712B). Therefore, no redundant interconnect may be placed substantially within polygonal structure (720).

Continuing the example, polygonal structure (722) is then considered. Other component (712B) is blocking the side space to the right of interconnect (706), but no other component is present in the side space to the left of interconnect (706). Therefore, side space within polygonal structure (722) may be available for a redundant interconnect (described below). The terms "right" and "left" are used here for illustrative purposes only and are not intended to limit the scope of the present disclosure.

Further continuing the example, polygonal structure (724) is then considered. As with polygonal structure (720), the side space associated with interconnect (706) within polygonal structure (724) is blocked by other components (712B, 712C). Therefore, no redundant interconnect may be placed within polygonal structure (724).

As described in more detail above with reference to FIGS. 1-2, determining (202) whether a side space of an interconnect of the electronic device is available for a redundant interconnect may include generating one or more polygonal space identifier(s) (203). In such a configuration as example structure (700), polygonal space identifiers (203) may include a plurality of values indicative of the size and shape of each polygonal space, the position of each polygonal space, and an indication of whether a side space within the polygonal space is available. In other configurations, more, less, or different data may be part of polygonal space identifier (203) without departing from the scope of the present disclosure.

In the illustrative example structure (700), after analyzing space constraints, analysis may then proceed to determine whether a line end electrically coupled to the interconnect may be extended into the side space for a distance sufficient to accommodate a redundant interconnect. As noted above, neither of conductive lines (702, 704) may be extended into the side space associated with interconnect (706) due to the presence of other components (712). With regard to polygonal space (722), however, space is available. Therefore, conductive lines (710) may be added to example structure (700) and extended into the side space associated with interconnect (706) and available for a redundant interconnect.

As described in more detail above with reference to FIGS. 1-2, determining (204) whether a line end electrically coupled to the interconnect may be extended into the side space for a distance sufficient to accommodate a redundant interconnect may include generating a longest common length (205). In such a configuration as example structure (700), longest common length (205) may include a value indicative of the amount of space available within polygonal space (722). In other configurations, more, less, or different data may be part of longest common length (205) without departing from the scope of the present disclosure.

Conductive lines (710) are electrically coupled to interconnect (706) as well as redundant interconnect (708). In some configurations, identifying the line end for extension into the side space for the distance when available may include identifying the need for a new line (710) (and thus a new line end) in order to accommodate the redundant interconnect(s). As described in more detail above with reference to FIGS. 1-2, identifying (206) the line end for extension may include generating an extendable line end identifier (207). In such a configuration as example structure (700), extendable line end identifier (207) may include a value indicative of the need for one or more new lines (710). In other configurations, more, less, or different data may be part of extendable line end identifier (207) without departing from the scope of the present disclosure.

Redundant interconnect (708) may be formed by any appropriate means, including those described in more detail above with reference to FIGS. 3-5. By establishing the presence of redundant interconnect (708) at the design stage, post-production selection of appropriate electrical paths may be avoided. Further, reliability of the electronic device may be improved by providing redundancy to at least a portion of the interconnect line path. Still further, this may be accomplished within the bounds of otherwise limiting manufacturing processes (e.g., spacer-is-metal processes in which line width is substantially constant).

Exemplary embodiments described herein are described largely in the context of a fully functional computer system for improving reliability of an electronic device. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method of improving reliability of an electronic device, the method comprising:
    providing a conductive line having a line end electrically coupled to an interconnect of the electronic device;
    selecting at least one polygonal space including a portion of the interconnect and at least a portion of a side space of at least one side of the interconnect;
    analyzing space constraints of the electronic device using said at least one polygonal space to determine whether the side space of the interconnect of the electronic device within the polygonal space is available for a redundant interconnect;
    forming said redundant interconnect if it is determined said side space is available;
    determining whether the line end electrically coupled to the interconnect may be extended into the side space for a distance sufficient to accommodate the redundant interconnect by determining whether an extension of the line end adversely impacts a characteristic of the line, topology of the electronic device, or the electronic device as a whole;
    identifying the line end available for extension into the side space for the distance; and
    forming a line end extension region at the line end available for extension to electrically couple the redundant interconnect to the conductive line via said line end extension region.

2. The method of claim 1 wherein determining whether the side space of the interconnect of the electronic device is available for the redundant interconnect comprises selecting a plurality of polygonal spaces and incrementally analyzing each of the polygonal spaces to identify portions of the side space on at least one side of the interconnect that are available to form at least a portion of said redundant interconnect.

3. The method of claim 1, wherein selecting the polygonal space comprises selecting at least one two-dimensional polygonal space and determining whether two side spaces of the interconnect of the electronic device are available for the redundant interconnect within said two-dimensional polygonal space.

4. The method of claim 1, wherein selecting the polygonal space comprises selecting a polygonal space on a timing critical path or a longest common length between the interconnect and the redundant interconnect.

5. The method of claim 1, wherein selecting the polygonal space comprises selecting at least one three-dimensional polygonal space and determining whether multiple side spaces of the interconnect of the electronic device are available for the redundant interconnect within said three-dimensional polygonal space.

6. The method of claim 1, wherein the redundant interconnect comprises a dummy interconnect formed as part of a process selected from the group consisting of spacer-is-metal process or a spacer-is dielectric process.

7. An apparatus for improving reliability of an electronic device, the apparatus comprising a computer processor, a computer memory operatively coupled to the computer processor, the computer memory having disposed within it computer program instructions capable of:
    selecting at least one polygonal space including a portion of an interconnect of the electronic device and at least a portion of a side space of at least one side of the interconnect;
    analyzing space constraints of the electronic device using said at least one polygonal space to determine whether the side space of the interconnect of the electronic device within the polygonal space is available for a redundant interconnect;
    determining whether the line end electrically coupled to the interconnect may be extended into the side space for a distance sufficient to accommodate the redundant interconnect formed in said side space;
    identifying the line end available for extension into the side space for the distance; and generating a line end extension region for the line end available for extension, that when formed, electrically couples the redundant interconnect to the conductive line via said line end extension region.

8. The apparatus of claim 7 wherein determining whether the side space of the interconnect of the electronic device is available for the redundant interconnect comprises selecting a plurality of polygonal spaces and incrementally analyzing each of the polygonal spaces to identify portions of the side space on at least one side of the interconnect that are available to form at least a portion of said redundant interconnect.

9. The apparatus of claim 7, wherein selecting the polygonal space comprises selecting at least one two-dimensional polygonal space and determining whether two side spaces of the interconnect of the electronic device are available for the redundant interconnect within said two-dimensional polygonal space.

10. The apparatus of claim 7, wherein selecting the polygonal space comprises selecting a polygonal space on a timing critical path or a longest common length between the interconnect and the redundant interconnect.

11. The apparatus of claim 7, wherein selecting the polygonal space comprises selecting at least one three-dimensional polygonal space and determining whether multiple side spaces of the interconnect of the electronic device are available for the redundant interconnect within said three-dimensional polygonal space.

12. The apparatus of claim 7, wherein the redundant interconnect comprises a dummy interconnect formed as part of a process selected from the group consisting of spacer-is-metal process or a spacer-is dielectric process.

13. A computer program product for improving reliability of an electronic device, the apparatus comprising a computer processor, a computer memory operatively coupled to the computer processor, the computer memory having disposed within it computer program instructions capable of:
selecting at least one polygonal space including a portion of an interconnect of the electronic device and at least a portion of a side space of at least one side of the interconnect;
analyzing space constraints of the electronic device using said at least one polygonal space to determine whether the side space of the interconnect of the electronic device within the polygonal space is available for a redundant interconnect;
determining whether the line end electrically coupled to the interconnect may be extended into the side space for a distance sufficient to accommodate the redundant interconnect formed in said side space;
identifying the line end available for extension into the side space for the distance; and
generating a line end extension region for the line end available for extension, that when formed, electrically couples the redundant interconnect to the conductive line via said line end extension region.

14. The computer program product of claim 13 wherein determining whether the side space of the interconnect of the electronic device is available for the redundant interconnect comprises selecting a plurality of polygonal spaces and incrementally analyzing each of the polygonal spaces to identify portions of the side space on at least one side of the interconnect that are available to form at least a portion of said redundant interconnect.

15. The computer program product of claim 13, wherein selecting the polygonal space comprises selecting at least one two-dimensional polygonal space and determining whether two side spaces of the interconnect of the electronic device are available for the redundant interconnect within said two-dimensional polygonal space.

16. The computer program product of claim 13, wherein selecting the polygonal space comprises selecting a polygonal space on a timing critical path or a longest common length between the interconnect and the redundant interconnect.

17. The computer program product of claim 13, wherein selecting the polygonal space comprises selecting at least one three-dimensional polygonal space and determining whether multiple side spaces of the interconnect of the electronic device are available for the redundant interconnect within said three-dimensional polygonal space.

18. The computer program product of claim 13, wherein the redundant interconnect comprises a dummy interconnect formed as part of a process selected from the group consisting of spacer-is-metal process or a spacer-is dielectric process.

19. The computer program product of claim 13 wherein the signal bearing medium comprises a recordable medium.

20. The computer program product of claim 13 wherein the signal bearing medium comprises a transmission medium.

* * * * *